United States Patent [19]

Brown

[11] 4,169,696

[45] Oct. 2, 1979

[54] HIGH PRESSURE FLUID PUMP

[75] Inventor: Ralph V. Brown, Cayuta, N.Y.

[73] Assignee: Facet Enterprises, Inc., Tulsa, Okla.

[21] Appl. No.: 841,517

[22] Filed: Oct. 12, 1977

[51] Int. Cl.² .............................................. F04B 17/04
[52] U.S. Cl. ................................................... 417/417
[58] Field of Search ......................................... 417/417

[56] References Cited

U.S. PATENT DOCUMENTS

| | | | |
|---|---|---|---|
| 1,064,103 | 6/1913 | Smith et al. | 417/417 |
| 1,337,388 | 4/1920 | Bradbury | 417/417 |
| 2,691,739 | 10/1954 | McHenry et al. | 417/417 X |
| 2,721,024 | 10/1955 | Zeh | 417/417 |
| 2,925,814 | 2/1960 | Vibber et al. | 417/417 X |
| 2,994,792 | 8/1961 | Parker | 417/417 X |
| 3,381,616 | 5/1968 | Wertheimer et al. | 417/417 |
| 3,400,663 | 9/1968 | Wertheimer | 417/417 |
| 3,459,132 | 8/1969 | Meyer | 417/417 |

Primary Examiner—Carlton R. Croyle
Assistant Examiner—Leonard E. Smith
Attorney, Agent, or Firm—Remy J. VanOphem

[57] ABSTRACT

A high pressure electromagnetic reciprocating fluid pump is disclosed herein. The pump has a pair of telescoping cylinders axially disposed inside a generally cylindrical cavity of a pump housing. Unidirectional valves disposed at the opposing ends of the telescoping cylinders cause a unidirectional fluid flow through the pump as the telescoping cylinders are reciprocated relative to each other by a solenoid driven armature.

8 Claims, 4 Drawing Figures

HIGH PRESSURE FLUID PUMP

BACKGROUND OF THE INVENTION

1. Field of the Invention

The invention is related to electrically actuated fluid pumps and in particular to electromagnetic reciprocating fluid pumps.

2. Prior Art

Electromagnetic reciprocating fluid pumps have found wide acceptance for a variety of applications. In general these pumps are highly reliable, quite efficient and are capable of generating relatively high pressures for their size. Typical examples of such fluid pumps are disclosed in U.S. Pat. No. 2,994,792, "Reciprocating Electro-Magnetic Motor," issued to L. C. Parker in August 1961, U.S. Pat. No. 3,381,616, "Electromagnetic Fluid Pump", issued to H. P. Wertheimer, et al in May 1968; and U.S. Pat. No. 3,400,663 issued to H. P. Wertheimer on Sept. 10, 1968. All of these pumps embody a hollow magnetically permeable armature disposed in a guide cylinder and reciprocated against a resilient bias by an intermittently energized solenoid coil. The solenoid coil may be energized by the action of an internal electrical switch, as taught by Parker in U.S. Pat. No. 2,994,792, or by any other means known in the art. The present preference is to use a blocking oscillator as taught by Wertheimer in U.S. Pat. No. 3,381,616 or as taught by the applicant in U.S. Pat. No. 3,629,674 "Transient Resistant Transistorized Blocking Oscillator for Switching Inductive Loads", issued on Dec. 21, 1972. These pumps have the disadvantage in that their output pressure is determined by the diameter of the hollow armature and the force generated by the resilient (spring) member. Those skilled in the art will quickly recognize that to significantly increase the output pressure by decreasing the diameter of the armature, or increasing the force supplied by the resilient member would require a significant increase in the size and power requirements of the solenoid coil. The disclosed fluid pump overcomes this problem and further permits the use of an armature made from a ceramic magnetic material having comparatively higher electrical resistance. The higher electrical resistance reduces eddy current losses in the armature increasing the efficiency of the pumps, and permits the pump to be operated at higher frequencies.

SUMMARY

The discosed electromagnetic reciprocating fluid pump has a pair of telescoping cylindrical members disposed within a generally cylindrical cavity of an external pump housing between a fluid inlet port and a fluid outlet port. Unidirection valves disposed at opposing ends of the telescoping cylindrical members, allow only a unidirectional fluid flow therethrough. The telescoping cylinders are axially reciprocated relative to each other by a solenoid driven armature operating against the force of a resilient biasing member. As the telescoping cylinders are reciprocated away from each other, the volume enclosed by the telescloping cylinders between the unidirectional valves increases thereby reducing the pressure therein. The unidirectional valve adjacent to the inlet opens and admits a fluid charge into the enlarged volume. Reciprocating the two cylinders towards each other compresses the trapped fluid causing the unidirectional valve adjacent to the outlet port to open allowing the pressurized fluid to flow out towards the outlet port.

The object of the invention is an improved reciprocating electromagnetic pump capable of pumping fluids at higher pressures.

Another object of the invention is a reciprocating electromagnetic pump having a pair of reciprocating telescoping members.

Still another object of the invention is a reciprocating electromagnetic pump having a ceramic armature to reduce eddy current losses and permit higher operating speeds.

A final object of the invention is a high pressure magnetic pump having the same general configuration as present production pumps with minimal variations in established production and assembly methods.

These and other advantages will become apparent to a person skilled in the art by reading the following detailed description in conjunction with the figures.

DETAILED DESCRIPTION OF THE PREFERRED EMBODIMENT

Figure 1:
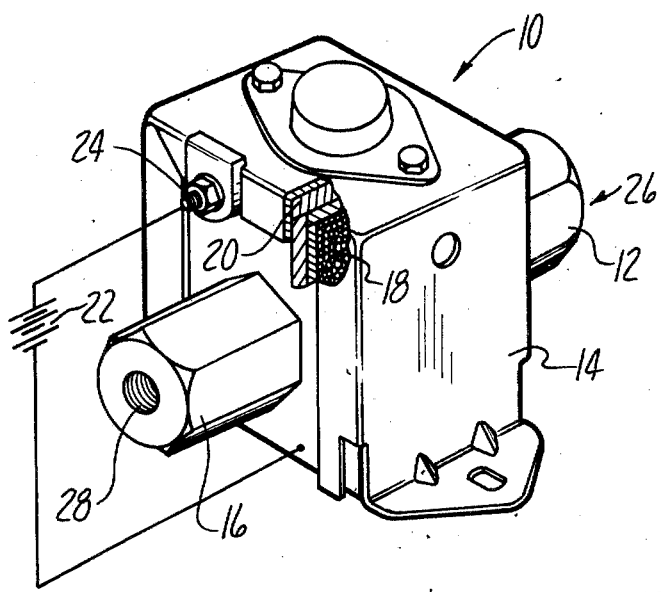
FIG. 1 is a perspective of the disclosed high pressure electromagnetic pump.

Referring to FIG. 1, there is shown a perspective of the high pressure reciprocation electromagnetic pump 10 having a hexagonally shaped inlet housing 12, a rectangular shaped central housing assembly 14 and a hexagonally shaped outlet housing 16. Disposed in the central housing assembly 14, is a solenoid coil assembly 18, and a source of intermittent electrical power such as a potted blocking oscillator assembly 20 is mounted to the top of the central housing assembly 14. Power is provided to the blocking oscillator assembly from a D.C. source of electrical power such as a battery 22 having one end connected to an electrical input terminal 24 of the potted assembly 20 and the other end connected to a common ground as well as the pump as shown by the electrical lead attached to the central housing assembly 14. The fluid flow through the pump is from an inlet port 26 to an outlet port 28.

Figure 2:
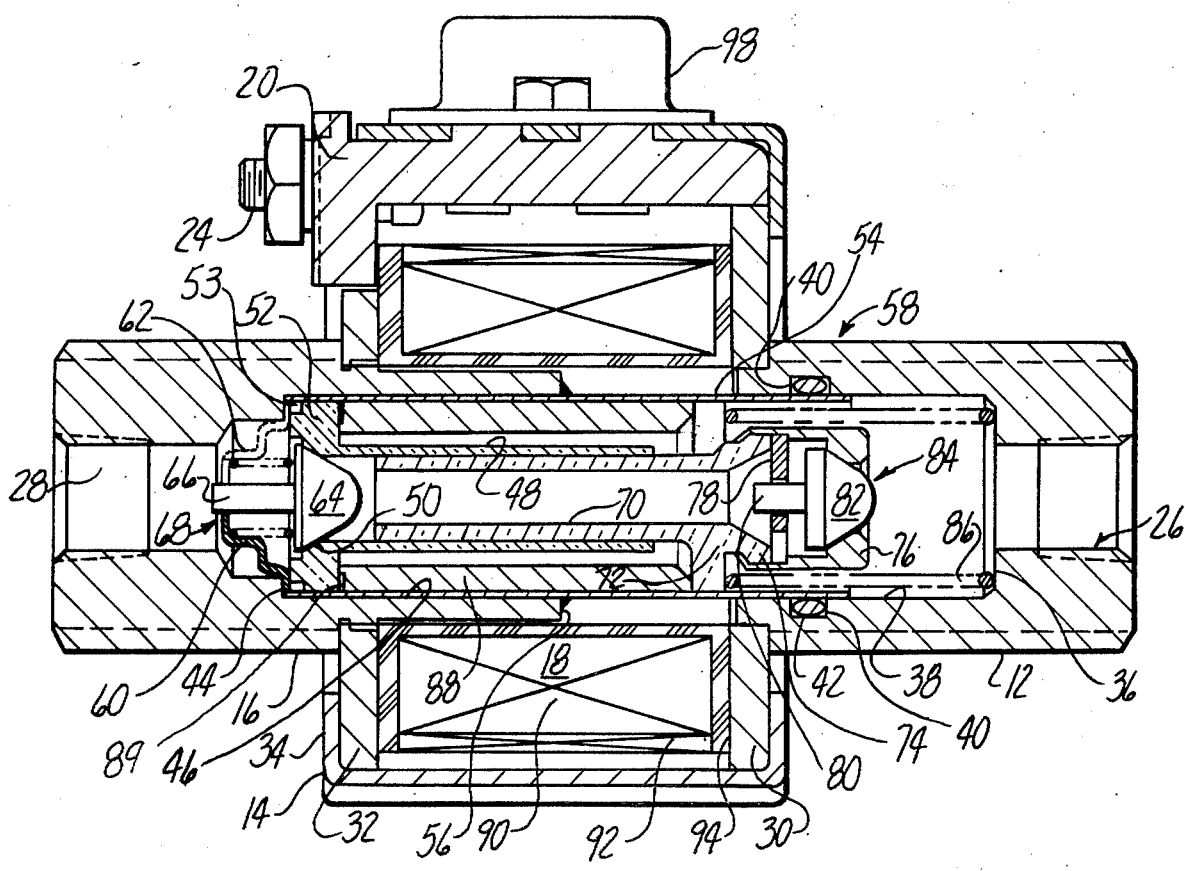
FIG. 2 is a cross section of the disclosed high pressure fluid pump.

The details of the high pressure electromagnetic pump 10 are shown in the cross section shown on FIG. 2. The inlet housing 12 is fixedly attached to a support plate 30 and the outlet housing 16 is threadedly mounted to a second support plate 32 coaxial with the inlet housing 12. The coil assembly 18 is clamped between the two support plates 30 and 32 by a cover 34 forming the central housing assembly 14.

The inlet housing 12 may be pressed into an aperture formed in the support plate 30 as shown or may be threadedly mounted, soldered, welded or otherwise secured to the support plate 30 using any known method. The inlet housing 12 has a threaded inlet port 26, a spring seat 36, an internal cylindrical surface 38 and a seal groove 40 recessed about the internal cyliner surface 38 a short distance from the end of the inlet housing attached to the support plate 30. The seal groove 40 receives a seal such as "O" ring 42 or any other type of seal packing as is known in the art.

The outlet housing 16 has a threaded outlet port 28, guide seat 44 and an internal cylindrical surface 46. A guide cylinder 48 having a valve seat 50 at one end and open at the other end is disposed inside of the outlet housing 16. The end of the guide cylinder 48 having the valve seat 50 has a radial flange 52 disposed at the end adjacent to the guide seat 44. The radial flange 52, has a solder groove 53 permitting the guide cylinder 48 to be fixedly attached to a nonmagnetic cylindrical member 54 by soldering or any other similar method forming a fluid tight seal therebetween. Cylindrical member 54 has an external diameter approximately equal to the diameter of internal surface 46 and is fixedly attached to the end 56 of the outlet housing 16 by soldering, welding or any other method known in the art to form a fluid tight seal between the external surface of the cylindrical member 54 and the outlet housing 16. The other end of the cylindrical member 54 extends into the inlet housing 12 a short distance beyond the "O" ring 42 as shown. The "O" ring 42 compressively engages the external surface of the cylindrical member 54 and forms a fluid tight seal between the cylindrical member 54 and the internal surface 38 of the inlet housing 12. The inlet housing 12, outlet housing 16 and the interconnecting cylindrical member 54 comprise the external housing of the pump 10.

A valve retainer 60 fixedly held between the flange 52 of the guide cylinder and the guide seat 44 forms a retainer for a resilient member such as spring 62 which holds an outlet valve button 64 against the valve seat 50 with a predetermined force. The valve retainer 60 has a valve guide aperture circumscribing a stem 66 on the outlet valve button 64 to maintain alignment between the valve button 64 and the valve seat 50 during movement of the valve button. The valve retainer also has fluid passage apertures not shown to permit a free fluid flow therethrough. Valve seat 50, valve button 64, retainer 60 and spring 62 comprise an outlet valve 68.

A telescoping member 70 having a cylindrical configuration has one end disposed within the guide member 48. A close tolerance fit between the external diameter of the telescoping member 70 and the internal diameter of the guide member 48 permits the telescoping member 70 to slide freely within the guide member 48 yet providing a long narrow high resistance leakage path for a fluid flow therebetween. The fluid leakage between the two telescoping members is significantly less than that encountered in the prior art pumps previously discussed and is one of the features which permits the pump to develop higher pressures. The other end of the telescoping member 70 has a radial flange 72 having one or more radial slots and a valve support boss 74. A valve seat member 76 is fixedly attached to the valve support boss 74, for example, by spinning the end of a cylindrical extension of the valve seat member into a groove formed in the boss as shown or any other convenient means known in the art. Fixedly disposed between the valve support boss 74 and the valve seat member 76 is a valve guide 78 having an aperture circumscribing the stem 80 of an inlet valve button 82. Valve guide 78 also has apertures permitting fluid to freely flow therethrough. The valve seat 76, valve guide 78 and valve button 82 comprise an inlet valve 84.

A resilient member, such as a spring 86 is disposed in the inlet housing 12 between the spring seat 36 and the radial flange 72 of the telescoping member 70 and urges the telescoping member 70 inwardly into the guide member 48 with a predetermined force.

A hollow cylidrical armature 88 is slidably disposed inside cylinder member 54 between the radial flanges 52 and 72 of the guide member 48 and the telescoping member 70 respectively.

In the preferred embodiment, the armature 88 is made from a magnetically susceptable metal such as soft iron, but may be made from magnetically susceptable ceramic material, such as 3B7 Ferrite, manufactured by Ferroxcube Corp of Saugerties, New York, having a significantly higher electrical resistance than the metallic (soft iron) armature of the preferred embodiment. The ceramic armature reduces eddy currents in the armature, increases the efficiency of the pump and further permits the pump to be operated at higher speeds. The armature 88 has a shallow peripheral undercut section 89 at the end adjacent to the radial flange 52. The small annular volume formed between the undercut section 89 and the radial flange 52 entraps a small volume of fluid which acts as a hydraulic bumper for the armature as it is urged toward the radial flange by spring 86 acting on radial flange 72. This configuration eliminates the need for a resilient stop between the armature 88 and the radial flange 52.

The solenoid coil assembly 18 is disposed around the pump housing between the two support plates 30 and 32. The solenoid coil assembly 18 has a solenoid coil 90 and a detection coil 92 wound on a coil bobbin 94. The potted assembly 20 is held on top of support plates 30 and 32 by the cover 34 and contains the circuit components of the source of intermittent electrical power for the solenoid coil assembly 18, such as the components of the blocking oscillator shown on FIG. 3.

Figure 3:
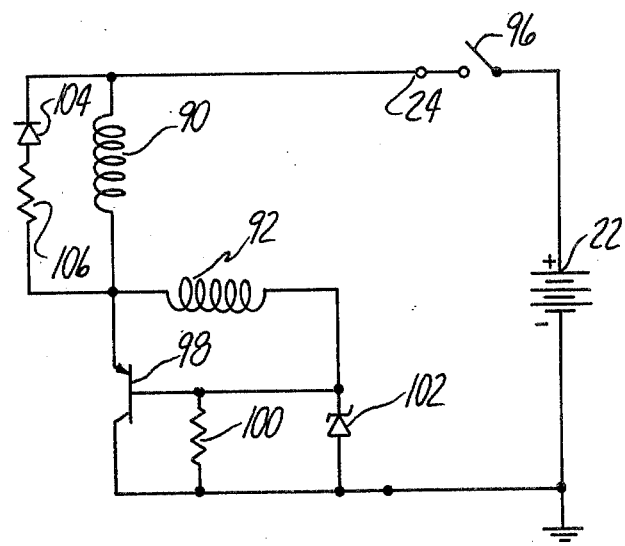
FIG. 3 is a circuit diagram of a blocking oscillator type source of electrical power used to intermittently energize the solenoid coil of the pump.

A circuit diagram of the blocking oscillator is shown on FIG. 3. In the circuit shown, one end of the solenoid coil 90 is connected to a source of electrical power such as battery 22 through the electrical input terminal 24. A switch 96 may be inserted between the end of the solenoid coil 90 and the battery 24 to permit the power to the blocking oscillator to be turned "on" or "off". The other end of the solenoid coil 90 is connected to the emitter of a transistor 98 and to one end of the detection coil 92. The other end of the detection coil 92 is connected to the base of transistor 98 and to the common ground through resistance 100. The collector of transistor 98 is connected to the common ground. A zener diode 102 is connected between the base of the transistor 98 and the common ground in parallel with resistance 100. A series connected diode 104 and resistance 106 are connected across the two ends of the solenoid coil 90 to dissipate a portion of the current induced in the solenoid coil when transistor 98 is turned off. The operation of the blocking oscillator is well known in the art and need not be discussed in detail.

Briefly, however, the operation is as follows. Upon closing switch 96, electrical current flows through solenoid coil 90 detection coil 92 and to the common ground through resistance 100. Transistor 98 is caused to become slightly conductive due to the bias established by the potential drop across the detection coil. The current flow through solenoid coil 90 is increased by the conduction of transistor 98. The increasing current flow through the solenoid coil 90 induces a current flow in the detection coil 92 which further forward biases transistor 98 until it becomes saturated. When transistor 98 is saturated, the current induced in the detection coil is terminated thereby reducing the bias signal applied to the base of the transistor taking it out of saturation and decreasing the current flow through the solenoid coil 90. A decreasing current flow in the solenoid coil 90 induces a current flow in the detection coil 92 of the opposite polarity. This induced current of the opposite polarity begins to back bias transistor 98, causing it to become less conductive. This further reduces the current flow through transistor 98, inducing a larger back biasing signal in the detection coil 92 thereby causing transistor 98 to quickly turn off completely thereby completing the oscillation cycle. After the energy induced in the solenoid coil by the collapsing magnetic field is dissipated, the cycle repeats. The functions of the zener diode 102 and the series connected diode 104 and resistance 106 are sufficiently understood by those skilled in the art that their functions need not be discussed in detail for an understanding of the invention.

OPERATION OF THE PUMP

In the following description of the pump it is assumed that the pump is already in operation and at least the inlet housing 12 and the volume defined by the guide and telescoping cylinders, 48 and 70 respectively are filled with the fluid to be pumped. In the rest position with the solenoid coil 90 de-energized, the telescoping member 70 and armature 88 are displaced towards the outlet port 28 by spring 86 with the armature abutting the radial flange 52 and 72.

The solenoid coil 90 is then energized by the cyclic operation of the blocking oscillator and generates a magnetic field which causes the armature 88 to be displaced towards the inlet port 26 against the bias of spring 86. As the armature 88 moves towards the inlet port, it carries with it the telescoping member 70 and the inlet valve assembly 84. The volume of the cavity between valve buttons 64 and 82 increases, causing a reduction in pressure within this defined cavity. The reduced pressure causes valve button 82 to unseat and a charge of fluid flows into the cavity between the two valve buttons. The solenoid is then de-energized. The telescoping member 70 and the armature 88 are upon de-energization urged towards the outlet port 28 by the resilient force of the spring 86. As the telescoping member 70 starts to move towards the outlet port 28, valve button 82 reseats and the fluid trapped between the two valve buttons is compressed. When the pressure of the trapped fluid exceeds the force of spring 62 holding valve button 64 against its seat, valve button 64 is unseated and the compressed fluid flows into the internal cavity of the outlet housing between the valve button 64 and the outlet port 28. The compressed fluid continues to flow from the cavity between valve buttons 64 and 82 until the armature 88 is again reseated against the radial flange 52 completing the pumping cycle. At this point solenoid 90 is re-energized once again displacing the armature 88 and telescoping member 70 towards the inlet port, thereby capturing another charge of fluid and the cycle is repeated.

Figure 4:
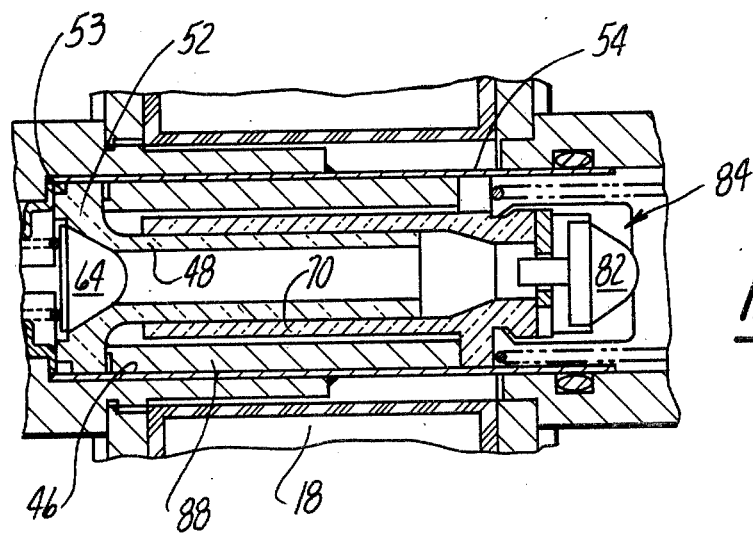
FIG. 4 is a cross section showing an alternate configuration of the telescoping cylindrical members.

An alternate arrangement of the guide cylinder and telescoping member is shown on FIG. 4. In this arrangement, the telescoping member 70 has the larger diameter and slides over the guide cylinder 48. As before, the guide cylinder 48 is fixedly attached to the outlet housing 16 and the telescoping member is reciprocated by the armature 88 against the force of spring 86. The other elements of the pump are identical to those illustrated and discussed with reference to FIG. 2 and the operation is the same.

The advantages of the disclosed high pressure pump are as follows:

1. The spring 86 works against the reduced area of the internal diameter of the guide cylinder 48 resulting in higher pumping pressures. Basically, pressure (P)=Force of spring 86 divided by the internal cross sectional area of the guide cylinder 48.

2. The output pressure can be varied by changing the diameter of the telescoping cylinders. No other change in the configuration of the other components of the pump or the assembly methods are required.

3. The close tolerance fit between the telescoping member 70 and the guide member 48 provides a long, narrow low leakage path of high resistance to the flow of the pressurized fluid increasing the volumetric efficiency of the pump.

4. The design of the pump permits the use of a ceramic armature resulting in increased efficiency and higher operating speeds due to the reduction in eddy currents attributable to the higher electrical resistance of the ceramic material.

Having disclosed the high pressure pump and the associated blocking oscillator with regards to a preferred embodiment, it is known that changes can be made to the configurations of the pump shown or the circuit of the blocking oscillator illustrated without departing from the spirit of the invention. It is not intended that the invention be limited to the illustrated configurations or the disclosed blocking oscillator circuit.

What is claimed is:

1. A high pressure fluid pump comprising:
   a housing having an inlet port, an outlet port and an internal cavity therebetween;
   a pair of telescoping cylinders disposed in said cavity, one of said telescoping cylinders having one end attached to said housing and the other of said telescoping cylinders having a radial flange at the opposite end;
   solenoid coil means disposed around said housing for periodically generating a magnetic field;
   a magnetically permeable cylindrical armature slidably disposed about said telescoping cylinders, said armature operative to axially displace said other telescoping cylinder in response to said magnetic field;
   resilient means for biasing said radial flange into contact relationship with said armature; and
   valve means disposed at opposite ends of said at least telescoping cylinders, said valve means providing a unidirectional fluid flow through said telescoping cylinders as said telescoping cylinders reciprocates relative to each other in response to the periodically generated magnetic field.

2. The fluid pump of claim 1 wherein said armature further includes a shallow recess at the end adjacent to said first radial flange forming a hydraulic bumper therebetween.

3. The fluid pump of claim 2 wherein said one cylinder is fixed to said housing at the end adjacent to said outlet port.

4. The fluid pump of claim 3 wherein said one cylinder has an internal diameter slightly greater than the external diameter of said other cylinder wherein the tolerances between the internal diameter of said one cylinder and the external diameter of said other cylinder are selected to allow free axial movement between the two cylinders and provide a long narrow path of high resistance to fluid flow therebetween.

5. An electromagnetic fluid pump comprising:
an external housing having an inlet port, and an outlet port interconnected by an internal cavity;
a guide cylinder fixedly disposed in said internal cavity adjacent to one of said ports;
a telescoping cylinder disposed in said internal cavity and axially received in said guide cylinder and axially movable therein; said telescoping cylinder having a radial flange on one end;
means for generating an intermittent magnetic field;
resilient means for generating a force biasing said telescoping cylinder to a predetermined axial position within said guide cylinder;
a magnetically permeable cylindrical armature slidably disposed around said guide cylinder and operative to engage said radial flange of said telescoping cylinder, said armature movable in response to said intermittent magnetic field and operative to axially displace said telescoping cylinder against the biasing force of said resilient means; and
valve means attached to opposing ends of said guide cylinder and said telescoping cylinder for providing a unidirectional fluid flow through said guide and telescoping cylinders as said telescoping cylinder reciprocates with respect to said guide cylinder.

6. The fluid pump of claim 5 wherein said armature is a ceramic armature having a high electrical resistance.

7. The fluid pump of claim 5 wherein said armature further includes a shallow recess at the end adjacent to said first radial flange forming a hydraulic bumper therebetween.

8. The fluid pump of claim 7 wherein said means for generating said intermittent magnetic field comprises a blocking oscillator, generating intermittent electrical signals, a solenoid coil generating said intermittent magnetic field in response to said intermittent electrical signals and a detection coil responsive to the magnetic field generated by said solenoid coil to generate a feedback signal for said blocking oscillator.

* * * * *

UNITED STATES PATENT AND TRADEMARK OFFICE
CERTIFICATE OF CORRECTION

PATENT NO. : 4,169,696
DATED : October 2, 1979
INVENTOR(S) : Ralph V. Brown

It is certified that error appears in the above-identified patent and that said Letters Patent are hereby corrected as shown below:

Column 1, line 51, delete "discosed" and insert ---disclosed---.

Column 1, line 62, delete "telescloping" and insert ---telescoping---.

Column 2, line 66, delete "cyliner" and insert ---cylindrical---.

Column 4, line 3, delete "cylidrical" and insert ---cylindrical---.

Column 5, line 55, delete "resetated" and insert ---reseated---.

Column 6, line 52, delete "at least" and insert ---pair of---.

Column 6, line 54, delete "reciprocates" and insert ---reciprocate---.

Column 6, line 62, delete "fixed" and insert ---fixedly attached---.

Signed and Sealed this

Twenty-second Day of April 1980

[SEAL]

Attest:

SIDNEY A. DIAMOND

Attesting Officer  Commissioner of Patents and Trademarks